United States Patent
Ha

(10) Patent No.: US 10,962,663 B2
(45) Date of Patent: Mar. 30, 2021

(54) METHOD, APPARATUS AND SYSTEM OF DETECTING FOREIGN OBJECTS IN LAUNDRY MACHINE

(71) Applicant: LG Electronics Inc., Seoul (KR)

(72) Inventor: Jeong Yo Ha, Gimpo-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/653,663

(22) Filed: Oct. 15, 2019

(65) Prior Publication Data

US 2020/0041673 A1 Feb. 6, 2020

(30) Foreign Application Priority Data

Sep. 4, 2019 (KR) .................. 10-2019-0109703

(51) Int. Cl.
*G01S 15/00* (2020.01)
*G01V 1/00* (2006.01)
*G06N 20/00* (2019.01)
*G01V 1/30* (2006.01)

(52) U.S. Cl.
CPC ............... *G01V 1/001* (2013.01); *G01V 1/30* (2013.01); *G06N 20/00* (2019.01)

(58) Field of Classification Search
CPC .......... G01V 1/001; G01V 1/30; G06N 20/00; G06N 3/006; G06N 3/0472; G06N 3/088; G06N 5/003; G06N 7/005; G06N 5/04; G06N 3/0436; G06N 3/084; G06N 3/0454; G06N 20/10
USPC ............................................. 340/93; 367/93
See application file for complete search history.

(56) References Cited

U.S. PATENT DOCUMENTS

| 5,755,118 A * | 5/1998 | Woo .................. D06F 39/087 68/12.21 |
| 2017/0041036 A1* | 2/2017 | Phung ................ H04B 1/3888 |
| 2017/0154302 A1* | 6/2017 | Streebin ................. G06T 7/521 |
| 2019/0372833 A1* | 12/2019 | Kline ..................... G06N 5/025 |

FOREIGN PATENT DOCUMENTS

| KR | 1998-034521 A | 8/1998 |
| KR | 10-2009-0119509 A | 11/2009 |

* cited by examiner

*Primary Examiner* — Tanmay K Shah
(74) *Attorney, Agent, or Firm* — Birch, Stewart, Kolasch & Birch, LLP

(57) ABSTRACT

A foreign object detecting system includes an apparatus of detecting foreign objects in a laundry machine and a server. The server includes an artificial intelligence model learner configured to generate a foreign object classifying engine trained with the collected noise data through an artificial neural network. the server transmits the trained foreign object classifying engine trained through the artificial intelligence model learner to the foreign object classifying apparatus, the foreign object type classifier classifies the type of foreign objects through the trained foreign object classifying engine transmitted from the server, and the communicator of the apparatus of detecting foreign objects in a laundry machine transmits information about the type of foreign objects to a foreign object appliance. According to the present disclosure, the foreign objects in the laundry machine can be detected using artificial intelligence (AI), an artificial intelligence-based foreign object type classifying technique, and a 5G network.

18 Claims, 8 Drawing Sheets

[FIG. 1]
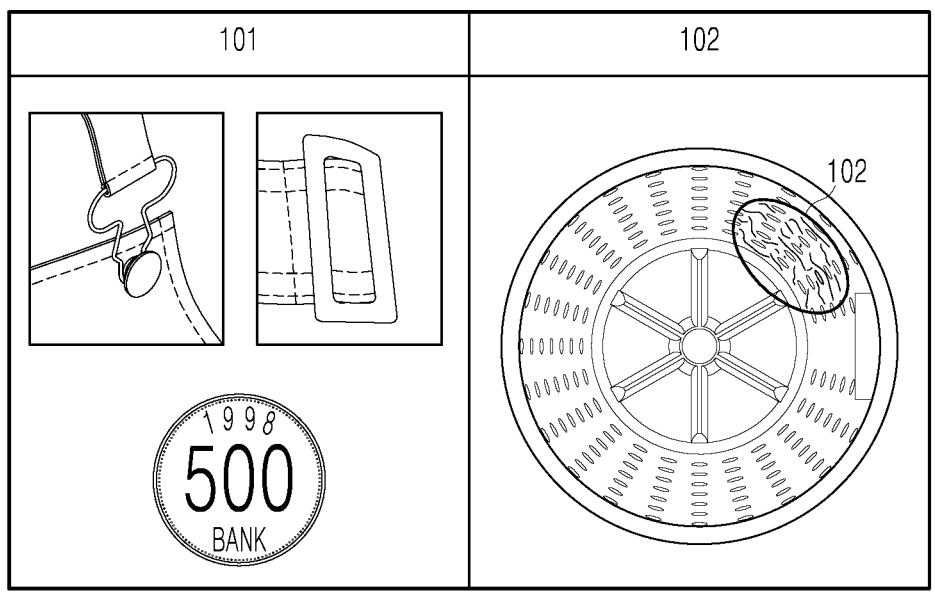

[FIG. 2]
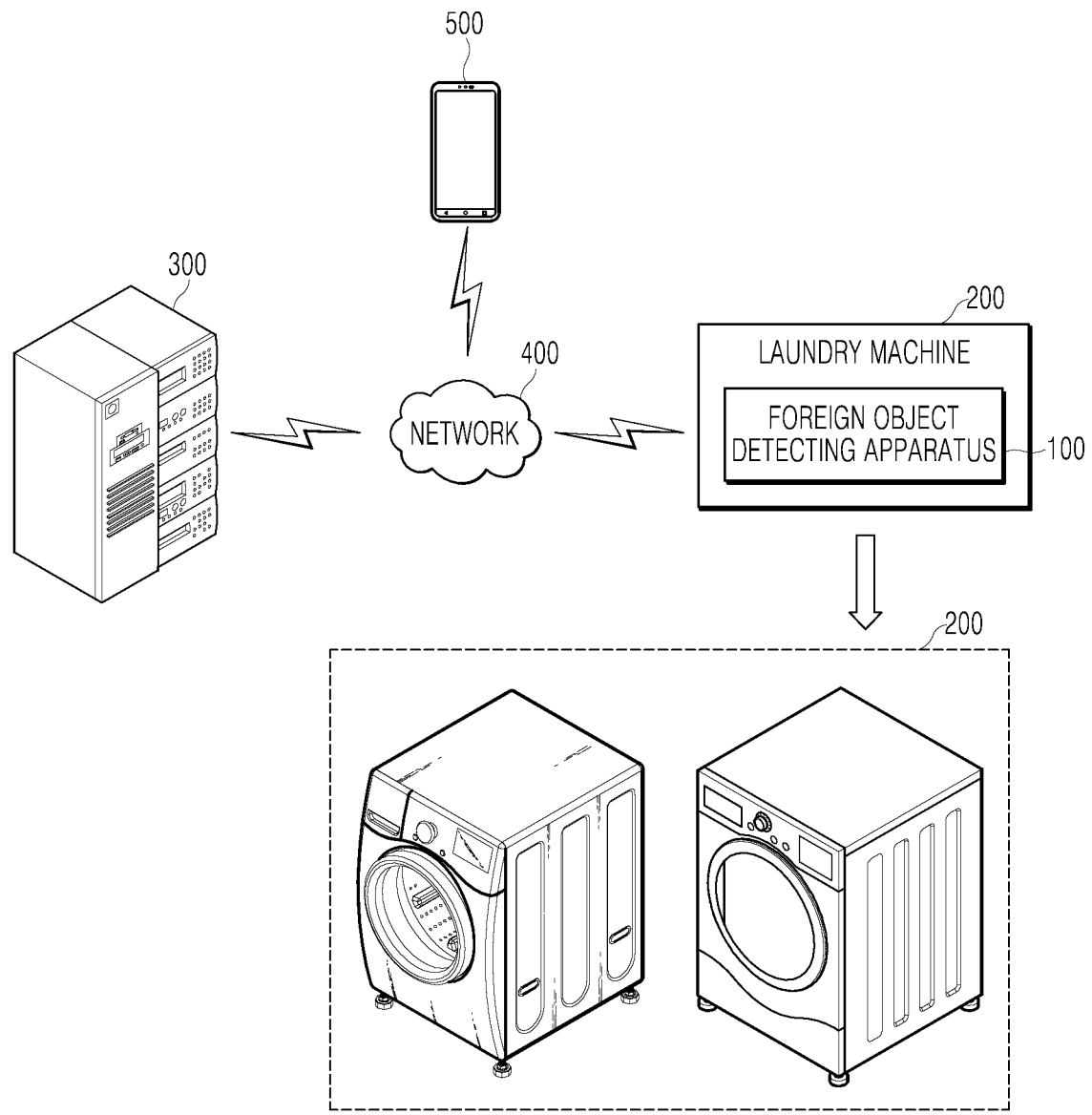

[FIG. 3]
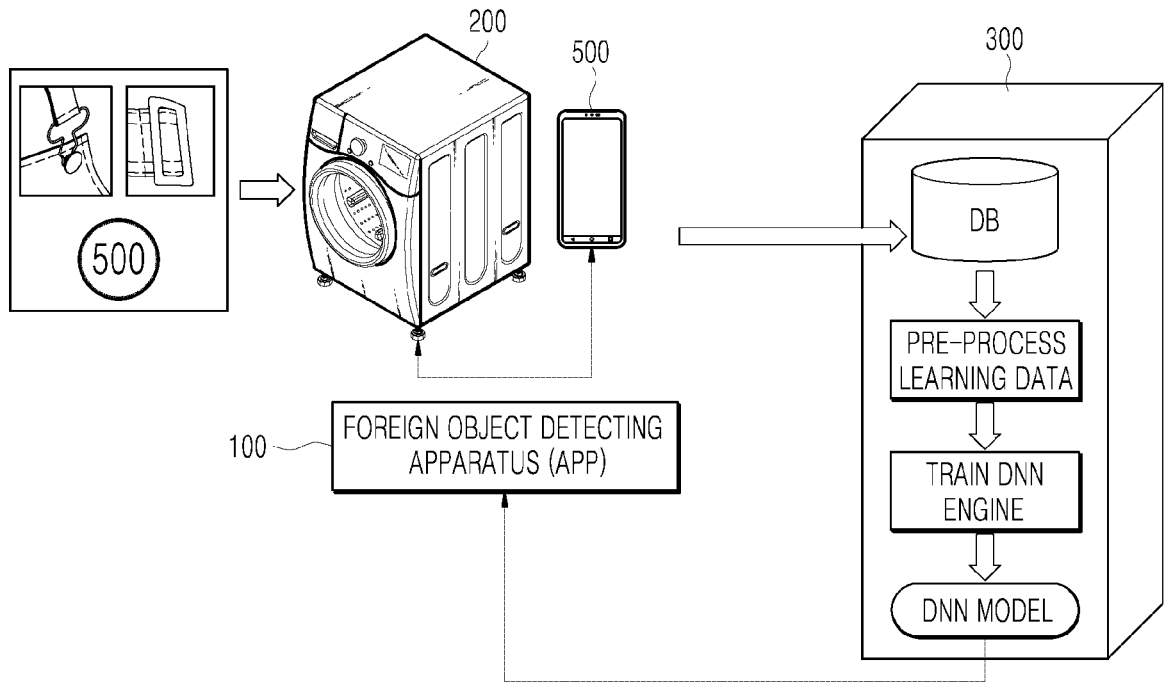
[FIG. 4]
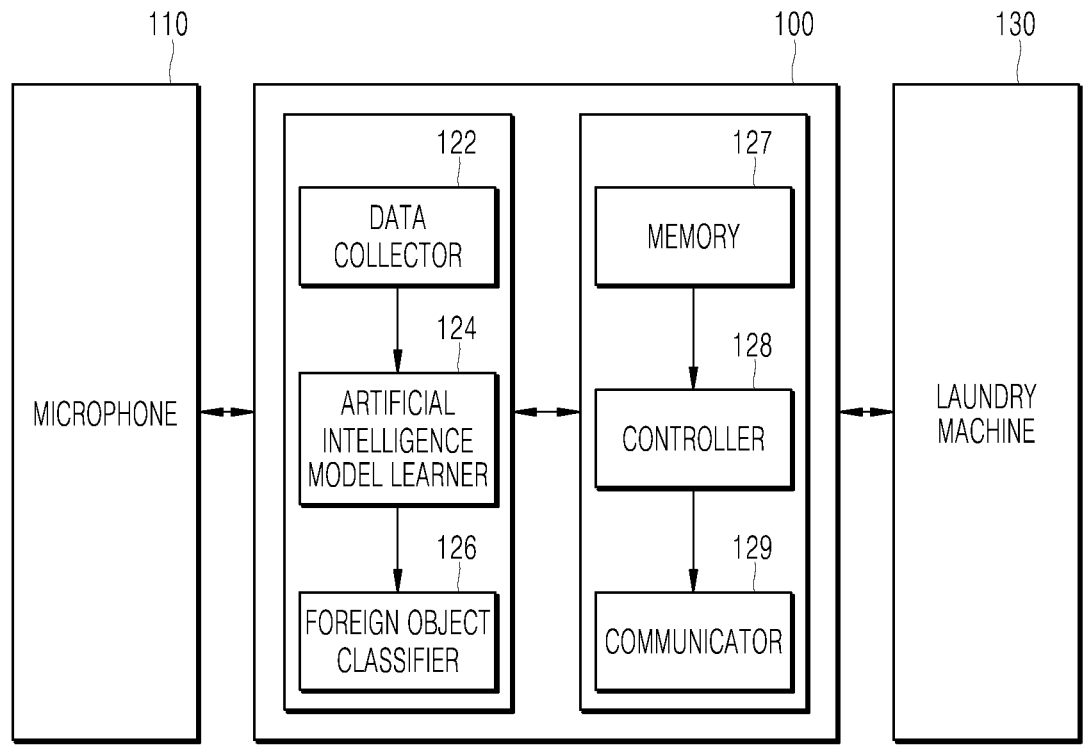

[FIG. 5]
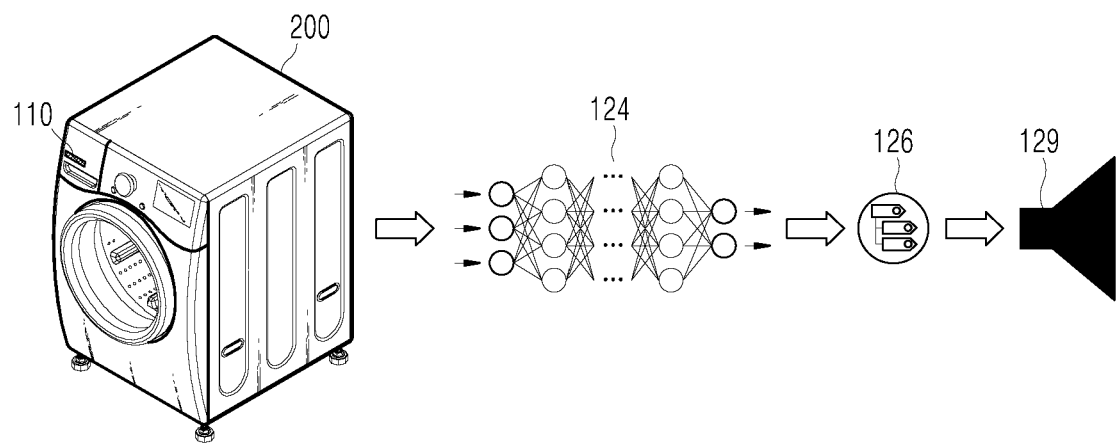

[FIG. 6]
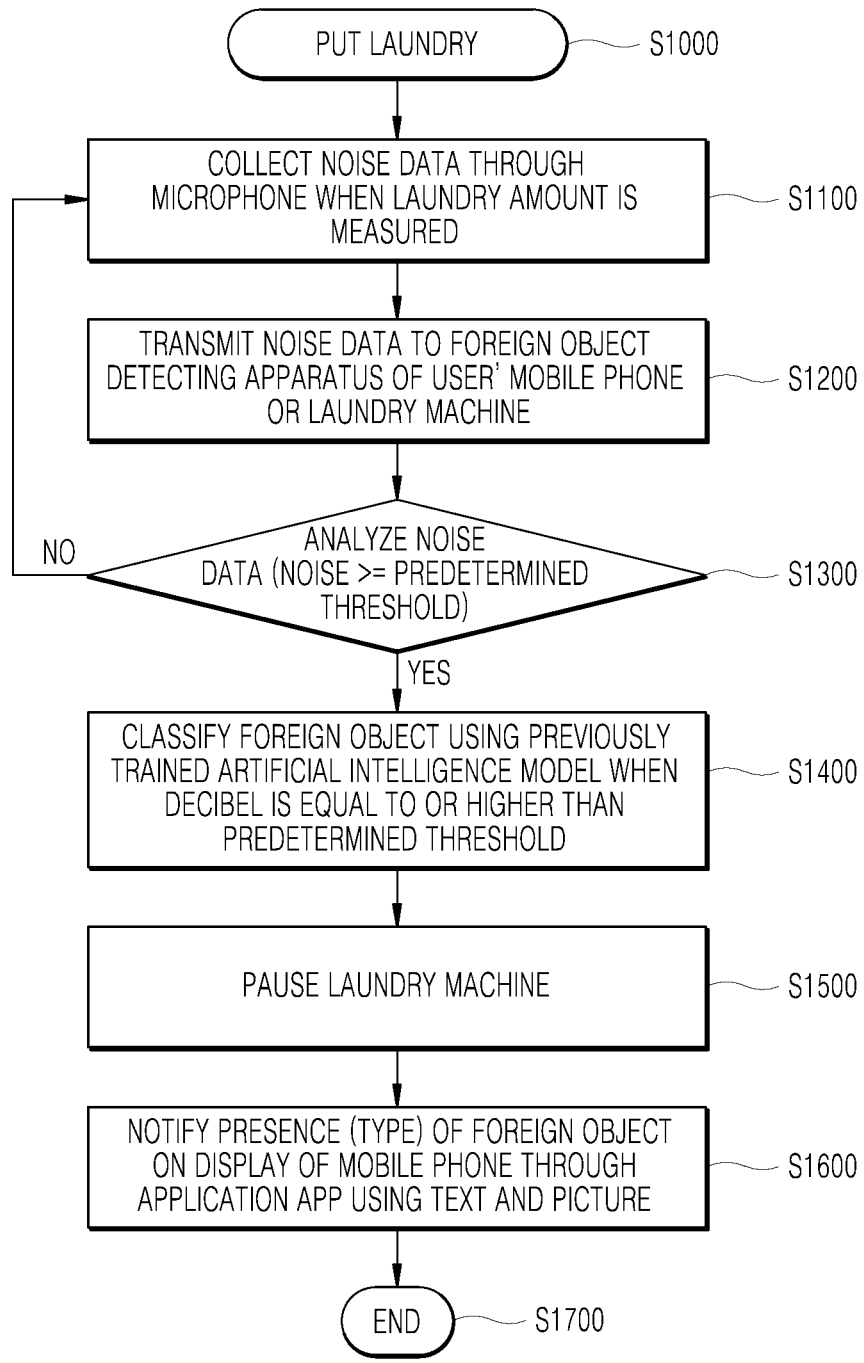

[FIG. 7]
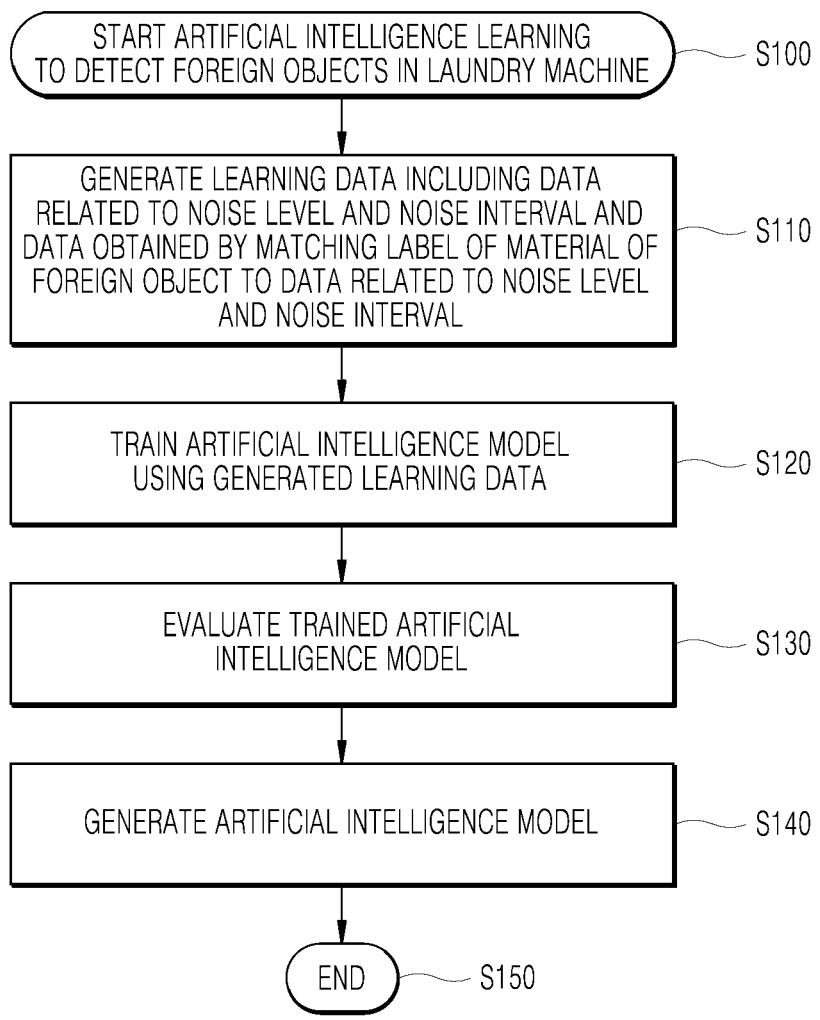

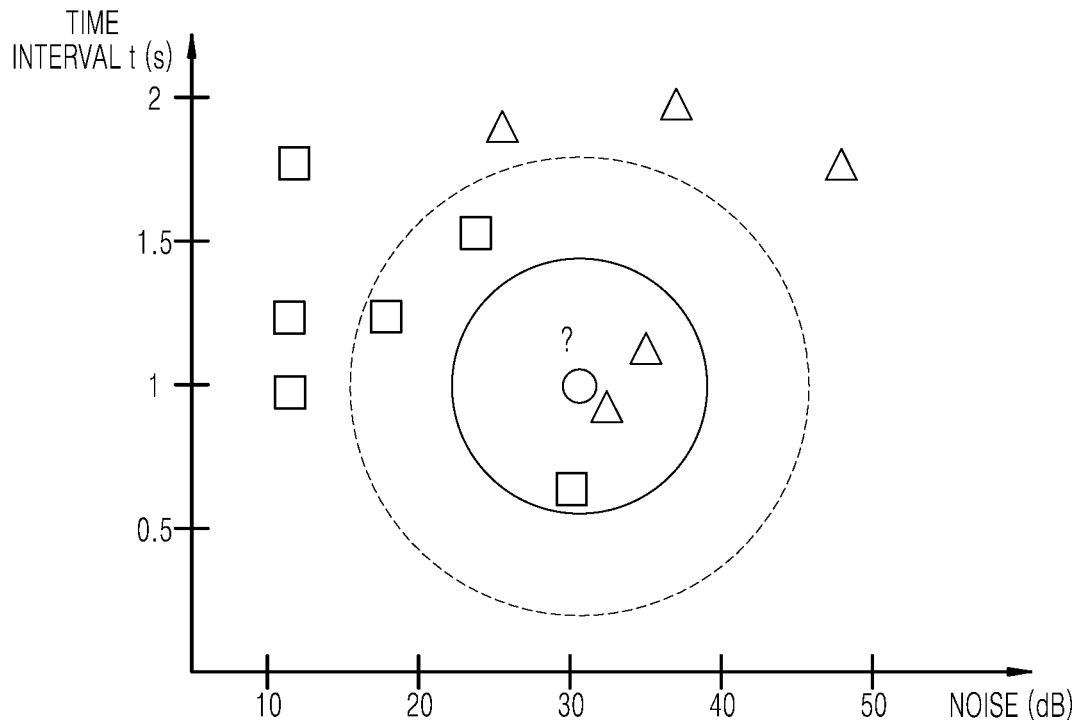

[FIG. 9]
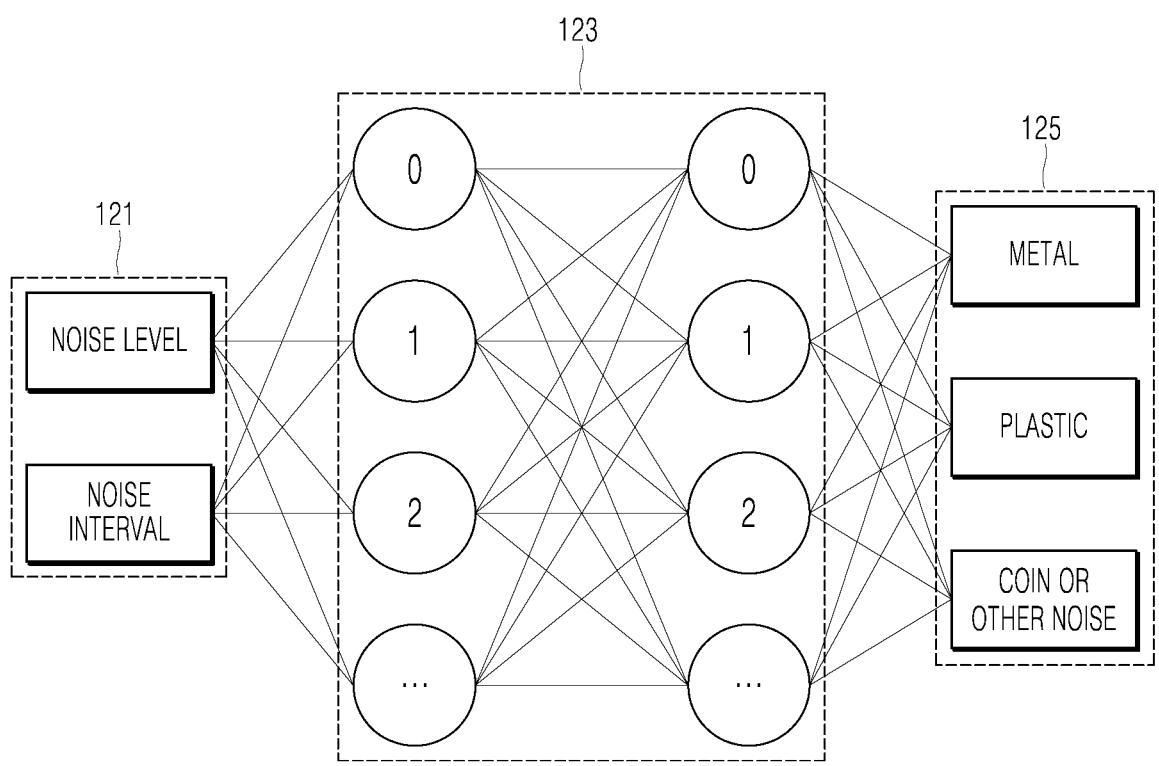

METHOD, APPARATUS AND SYSTEM OF DETECTING FOREIGN OBJECTS IN LAUNDRY MACHINE

CROSS-REFERENCE TO RELATED APPLICATION

This present application claims benefit of priority to Korean Patent Application No. 10-2019-0109703, entitled "METHOD, APPARATUS AND SYSTEM OF DETECTING FOREIGN OBJECTS IN WASHING/DRYER MACHINE," and filed on Sep. 4, 2019, in the Korean Intellectual Property Office, the entire disclosure of which is incorporated herein by reference.

BACKGROUND

1. Technical Field

The present disclosure relates to a method, an apparatus, and a system of detecting noises due to foreign objects of a laundry in a tub of a laundry machine through a microphone, and more particularly, to a method, an apparatus, and a system of detecting foreign objects based on a sensor or artificial intelligence.

2. Description of the Related Art

In the present disclosure, foreign objects refer to metals (buckles, coins, etc.) or very hard plastic materials, coins, etc. which are put into the laundry machine to cause a damage of a tub including the laundry during the washing process. A laundry machine may be, but is not limited to, a washer, a dryer, or a combination washer and dryer.

In the related art, when foreign objects are mixed in a laundry in the laundry machine, the laundry machine does not include a device of detecting the foreign objects. Therefore, the foreign objects may cause a damage to a tub of the laundry machine.

In the related art, according to a control method of a washer having a speech recognition function which recognizes a speech signal of a user to manipulate with a speech, when a severe noise is generated due to excessive unbalance of a laundry during the dewatering through a microphone, a self-diagnosis function which performs a laundry unbalance prevention course and then performs the dewatering again so that a noise having a predetermined level or higher is not generated during the dewatering and detects a sound generated from each component during the washing/dewatering course or before performing the course such as washing/dewatering courses to determine whether the component is broken is realized. However, according to the control method of a washer having a speech recognition function, a microphone is mounted in the washer to detect the noise due to the unbalance so that it is difficult to figure out various noise patterns caused by foreign objects in the laundry machine.

In the related art, another embodiment relates to a sound control method which provides progress information of the washer to a user through a sound while offsetting a noise generated during the operation of the washer. To this end, according to the present disclosure, an operation of a washer is performed in accordance with an input operating instruction, a pattern of a noise generated during the operation of the washer is detected, and a sound for offsetting the detected noise is read, and the noise is minimized by a masking effect which maps the read sound to the noise to output the sound. Further, starting, finishing, and changing of the course are detected in accordance with a noise pattern and whether the user approaches is detected to output a feedback sound, so that the progress information of the washer is known. However, the sound control method is to offset the noise of the noise pattern generated during the washing course so that when the foreign objects are mixed in the laundry, it is difficult to find out whether the noise is caused by the foreign objects.

SUMMARY OF THE INVENTION

An embodiment of the present disclosure is to find foreign objects in a laundry machine at an initial stage of the washing/drying process.

An embodiment of the present disclosure is to prevent a tub from being damaged due to the foreign objects when the laundry machine rotates and protect the laundry.

An embodiment of the present disclosure is to manufacture a smart laundry machine by recognizing noises of foreign objects when the laundry machine rotates to stop the laundry machine course and notify the user.

The present disclosure is not limited to what has been described above, and other aspects and advantages of the present disclosure will be understood by the following description and become apparent from the embodiments of the present disclosure. Furthermore, it will be understood that aspects and advantages of the present disclosure may be achieved by the means set forth in claims and combinations thereof.

In order to achieve the above-described object, according to an aspect of the present disclosure, a method, an apparatus, and a system of detecting foreign objects in a laundry machine may estimate a type of foreign objects based on the AI technology.

Specifically, according to an aspect of the present disclosure, a foreign object detecting method includes: collecting noise data generated when a tub rotates after putting a laundry in the tub through a microphone mounted in a laundry machine; monitoring whether the collected noise data exceeds a predetermined threshold; and estimating a type of foreign objects through a previously trained artificial intelligence model when the collected noise data exceeds the predetermined threshold.

According to an aspect of the present disclosure, an apparatus of detecting foreign objects in a laundry machine includes: a microphone mounted in a laundry machine configured to detect a noise generated when a tub rotates after putting a laundry in the tub; and a foreign object classifier configured to monitor whether the noise data collected by the microphone exceeds a predetermined threshold and estimate a type of foreign objects through a previously trained artificial intelligence model when the collected noise data exceeds the predetermined threshold.

According to another aspect of the present disclosure, a system of detecting foreign objects in a laundry machine may include an apparatus of detecting foreign objects in a laundry machine and a server, the foreign object detecting apparatus includes: a microphone mounted in a laundry machine configured to detect a noise generated when a tub rotates after putting a laundry in the tub; and a foreign object classifier configured to monitor whether the noise data collected by the microphone exceeds a predetermined threshold and estimate a type of foreign objects through a previously trained artificial intelligence model when the collected noise data exceeds the predetermined threshold, the server includes an artificial intelligence model learner configured to generate a foreign object classifying engine trained with the collected noise data through an artificial neural network, the server is configured to transmit the trained foreign object classifying engine trained through the artificial intelligence model learner to the foreign object detecting apparatus, and the foreign object classifier is configured to classify a type of foreign objects through the trained foreign object classifying engine transmitted from the server.

In addition, other methods and systems for implementing the present disclosure, and a computer program for executing such methods, may be provided.

Other aspects and features as well as those described above will become clear from the accompanying drawings, claims, and the detailed description of the present disclosure.

According to the embodiment of the present disclosure, it is possible to minimize a damage of a tub in the laundry machine due to foreign objects using artificial intelligence (AI), an artificial intelligence-based sound recognizing technique, and a 5G network.

According to the embodiment of the present disclosure, the foreign objects in the laundry machine are found at the beginning of the washing/drying process to minimize the damage of the tub of the laundry machine and the damage of the fabric and protect the tub and fabric.

According to the embodiment of the present disclosure, the noise may be prevented in advance at the time of washing/drying.

According to the embodiment of the present disclosure, noise data which is obtained from the laundry machine is transmitted to a user terminal and a computational burden of the laundry machine may be distributed by fast computation through a computing function of the terminal.

Effects of the present disclosure are not limited to the above description, and other effects, which have not been mentioned, can be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which:

FIG. 1 is an example of a foreign object which causes a damage of a tub of a laundry machine and a damage in a tub caused by the foreign object;

FIG. 2 is an exemplary diagram of a system environment including a foreign object detecting apparatus, a user terminal, a server, and a network which communicably connects the above components;

FIG. 3 is an exemplary diagram of a foreign object detecting system including a foreign object detecting apparatus which operates in a laundry machine and a user terminal and a server;

FIG. 4 is a block diagram of a foreign object detecting apparatus according to an embodiment of the present disclosure;

FIG. 5 is a view schematically illustrating a foreign object detecting process of a foreign object detecting apparatus according to an embodiment of the present disclosure;

FIG. 6 is a flowchart of a method of detecting foreign objects in a laundry machine according to an embodiment of the present disclosure;

FIG. 7 is a flowchart of training a foreign object classifying engine by an artificial intelligence model learner according to an embodiment of the present disclosure;

FIG. 8A is an exemplary diagram of a K-nearest neighbor algorithm according to an embodiment of the present disclosure;

FIG. 8B is an exemplary diagram of classifying a type of materials of foreign objects according to a noise level of a foreign object; and FIG. 9 is an exemplary diagram of an artificial neural network according to an embodiment of the present disclosure.

DETAILED DESCRIPTION

The advantages and features of the present disclosure and ways to achieve them will be apparent by making reference to embodiments as described below in detail in conjunction with the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, these terms such as "first," "second," and other numerical terms, are used only to distinguish one element from another element. These terms are generally only used to distinguish one element from another.

Hereinafter, embodiments of the present disclosure will be described in detail with reference to the accompanying drawings. Like reference numerals designate like elements throughout the specification, and overlapping descriptions of the elements will not be provided.

FIG. 1 is an example of a foreign object which causes a damage of a tub of a laundry machine and a damage in a tub caused by the foreign object.

A laundry machine 200 includes a tub which rotates to wash a laundry. When foreign objects 101 such as a metal buckle, a plastic buckle, and coins are included in the laundry, scratches 102 may be generated on the tub when the tub rotates for washing/drying courses. The scratches may shorten a lifespan of the tub and cause a damage of the laundry. When the tub rotates, metals, plastics, and coins cause friction with a tub surface to generate a noise pattern having a predetermined noise level and a noise interval, which is different from that of the noise due to the washing/drying. Therefore, a foreign object detecting apparatus monitors a noise level and a noise interval to estimate the presence of the foreign object and a type of foreign object.

Foreign objects which can be put into the laundry machine may be metals, plastics, and coins or other materials. In addition, the foreign objects may include hair pins, toys, ballpoint pens, metal buttons, plastic buttons, or the like.

FIG. 2 is an exemplary diagram of a system environment including a foreign object detecting apparatus, a user terminal, a server, and a network which communicably connects the above components.

The foreign object detecting apparatus 100 may detect the foreign objects in the laundry machine using big data, an artificial intelligence (AI) algorithm and/or a machine learning algorithm in the 5G environment connected for Internet of Things.

A foreign object detecting environment may include the foreign object detecting apparatus 100, the laundry machine 200, a server 300, a network 400, and a user terminal 500. The foreign object detecting apparatus 100 is integrated in the laundry machine 200 to monitor the noise through a microphone, thereby detecting the presence of the foreign objects and estimating a type of the foreign objects.

In another embodiment of the present disclosure, the foreign object detecting apparatus 100 may be executed in the user terminal 500 in the form of application. The user terminal 500 may receive matters related to noise data from the microphone of the laundry machine 200, analyze the noise data, and transmit various control signals to stop the washing/drying course and protect the tub to the laundry machine 200 when the foreign objects are found. Further, when the foreign objects are found, the user terminal may notify the user through an alarm or a voice.

In the embodiment of the present disclosure, the foreign object detecting apparatus 100 may communicate with the user terminal 500 and the server 300 through the network 400 and perform machine learning such as deep learning. In a memory 127, data used for the machine learning and result data may be stored.

The server 300 may be a database server which provides big data required to apply various artificial intelligence algorithms and data for operating the foreign object detecting apparatus 100. In addition, the server 300 may include a web server or an application server which remotely controls an operation of the foreign object detecting apparatus 100 using a foreign object detecting application or a foreign object detecting control web browser installed in the user terminal.

Artificial intelligence (AI) is an area of computer engineering science and information technology that studies methods to make computers mimic intelligent human behaviors such as reasoning, learning, self-improving, and the like.

In addition, the artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed. More specifically, machine learning is a technology that investigates and builds systems, and algorithms for such systems, which are capable of learning, making predictions, and enhancing their own performance on the basis of experiential data. Machine learning algorithms, rather than executing rigidly-set static program commands, may take an approach that builds a specific model based on input data for deriving a prediction or decision.

The network 400 may serve to connect the foreign object detecting apparatus 100, the server 300, and the user terminal 500 to each other. The network 400 may include a wired network, such as a local area network (LAN), a wide area network (WAN), a metropolitan area network (MAN), or an integrated service digital network (ISDN), or a wireless network, such as a wireless LAN, CDMA, Bluetooth, or satellite communication; however, the present disclosure is not limited thereto. In addition, the network 400 may transmit and receive information using short distance communication and/or long distance communication. Here, the short distance communication may include Bluetooth, radio frequency identification (RFID), infrared data association (IrDA), ultra-wideband (UWB), ZigBee, or wireless fidelity (Wi-Fi) technology, and the long distance communication may include code division multiple access (CDMA), frequency division multiple access (FDMA), time division multiple access (TDMA), orthogonal frequency division multiple access (OFDMA), or single carrier frequency division multiple access (SC-FDMA) technology.

The network 400 may include a connection of network elements such as a hub, a bridge, a router, a switch, and a gateway. The network 400 can include one or more connected networks, for example, a multi-network environment, including a public network such as an internet and a private network such as a safe corporate private network. The access to the network 400 can be provided via one or more wired or wireless access networks. Further, the network 400 may support 5G communication and/or an Internet of things (IoT) network for exchanging and processing information between distributed components such as objects.

FIG. 3 is an exemplary diagram of a foreign object detecting system including a foreign object detecting apparatus which operates in a laundry machine and a user terminal and a server.

In the foreign object detecting apparatus 100 and the server 300, an artificial neural network may be loaded. Further, the foreign object detecting apparatus 100 may transmit foreign object information identified through a trained artificial intelligence model to the user terminal 500 in response to the operation mode.

The foreign object detecting apparatus 100 may use the server 300 to train the artificial intelligence model which infers (or classifies) a type of foreign objects. For example, the foreign object detecting apparatus 100 includes an artificial intelligence model learner 124 to directly generate and use the previously trained artificial intelligence model for classifying the type of foreign objects by itself. However, the server 300 may include the artificial intelligence model learner or use big data collected by the server 300 instead.

The foreign object detecting apparatus 100 may use various programs related to the artificial intelligence algorithm which is stored in a local area or stored in the server 300. That is, the server 300 serves to collect data and train the artificial intelligence model using the collected data. The foreign object detecting apparatus 100 may classify the presence and the type of foreign objects based on the generated artificial intelligence model.

The server 300 may receive noise data caused by the foreign objects and data which is matched with a label of a type of foreign objects from a microphone mounted in the laundry machine 200. The server 300 may provide training data required to identify the type of foreign objects and various programs related to the artificial intelligence algorithm such as API or a workflow to the user terminal using the artificial intelligence algorithm. That is, the server 300 may train the artificial intelligence model using training data including noise data for classifying the type of foreign objects and data obtained by matching a label of the type of foreign objects to the noise data. Further, the server 300 may train the artificial intelligence model using training data including data related to a level and an interval of the noise and data related to the type of foreign objects. In addition, the server 300 may evaluate the artificial intelligence model and update the artificial intelligence model for better performance even after the evaluation. Here, the foreign object detecting apparatus 100 may perform a series of steps performed by the server 300 solely or together with the server 300.

The server 300 may include an artificial intelligence model learner which generates an artificial intelligence model trained through a deep neural network (DNN) with a collected noise pattern having a noise level and interval. The artificial intelligence model learner of the server may be configured to extract learning data required to learn through the deep neural network from a database in which the level and the interval of the noise required for machine learning or deep learning and data required to estimate a type of foreign objects are stored, pre-process the learning data to increase an accuracy of the learning data, learn the learning data through the deep neural network (DNN), and generate the trained artificial intelligence model.

The preprocessing of the data refers to increase the accuracy of the source data as much as possible by removing or modifying the learning data. Further, when data having significantly low importance is excessively included, the data is appropriately reduced to be changed to be easily managed and used. The data preprocessing includes data cleansing, data integration, data conversion, data reduction, and the like. The data cleansing is to fill in missing values, smooth noisy data, identify an outlier, and correct data inconsistency.

The server 300 may be configured to transmit the trained artificial intelligence model trained by the artificial intelligence model learner to the foreign object detecting apparatus 100. A foreign object classifier 126 of the foreign object detecting apparatus 100 may be configured to classify the type of foreign objects by the trained artificial intelligence model transmitted from the server.

FIG. 4 is a block diagram of a foreign object detecting apparatus according to an embodiment of the present disclosure.

The laundry machine 200 may include a microphone 110 which senses a noise of a laundry machine, a foreign object detecting apparatus 100 which detects foreign objects, and a laundry machine operator 130 which executes a washing/drying course.

The foreign object detecting apparatus 100 may be located in the laundry machine or installed in the user terminal 500 as an application app. The microphone 110 may be a microphone which is installed in the laundry machine 200 to recognize speech or sounds. The microphone may be separately integrated in the foreign object detecting apparatus 100 in addition to a microphone mounted in a commercialized laundry machine.

The foreign object detecting apparatus 100 may include a data collector 122 which receives noise data from the microphone 110 and a foreign object classifier 126 which estimates the type of foreign object from the collected noise data. Further, the foreign object detecting apparatus 100 may include a memory 127 which stores various data, a communicator 129 which communicates with external devices, and a controller 128 which controls the data collector 122, the artificial intelligence model learner 124, the foreign object classifier 126, the memory 127, and the communicator 129 and stops the operation of the laundry machine 200 when there is a foreign object in the foreign object detecting apparatus 100.

The controller 128 may control to stop an operation of the laundry machine 200 based on information about the type of foreign objects classified by the foreign object classifier 126. The controller may generate a control signal having protocol information to communicate with the user terminal 500 and the server 300 with respect to noise information detected by the microphone 110 and type (material) information of the foreign objects classified by the foreign object classifier 126. The communicator 129 serves to transmit the generated control signal to the user terminal 500 and the server 300 and notify the user terminal 500 of foreign object presence information.

The foreign object detecting apparatus 100 may train the artificial intelligence model based on data transmitted from the microphone 110. To this end, the foreign object detecting apparatus 100 may include a data collector 122, an artificial intelligence model learner 124, and a foreign object classifier 126. The data collector 122 may collect data required to classify the type of foreign objects from the microphone 110 which is mounted in the laundry machine 200 or installed therein. The artificial intelligence model learner 124 learns with learning data including a plurality of noise data and data obtained by matching a label of the type of foreign object to the plurality of noise data and may train the foreign object classifying engine to estimate and output the type of foreign objects. The foreign object classifier 126 may estimate and output the type of foreign objects through the foreign object classifying engine based on the collected noise data. The information of the type of foreign object output from the foreign object classifier 126 may be matched to the noise data to be stored in the memory 127.

The data collector 122 may generate artificial intelligence learning data and testing data including noise data including a noise level and a noise interval and data obtained by matching a label of the type of foreign object to the noise data. In the embodiment of the present disclosure, the data obtained by matching a label of the type of foreign object may utilize data which matches the type of foreign objects to the noise level and the noise interval stored in advance in a database of the server. The server 300 may receive or store noise data required to classify the type of foreign objects from another laundry machine 200 and provide the noise data to the foreign object detecting apparatus 100.

A ratio of the learning data and the testing data may vary depending on an amount of data, and generally may be defined as a ratio of 7:3. The data for learning an artificial intelligence model may be subjected to the data pre-processing and data augmentation process to obtain an accurate learning result.

In another embodiment of the present disclosure, as described with reference to FIG. 3, the foreign object detecting apparatus 100 may use the server 300 to train an artificial intelligence model which infers (or classifies) the type of foreign object. The server 300 may receive noise-related data obtained by the foreign object detecting apparatus 100 from the foreign object detecting apparatus 100. The server 300 may be configured to transmit the foreign object classifying engine trained by the artificial intelligence model learner to the foreign object detecting apparatus 100. The foreign object classifier 126 of the foreign object detecting apparatus 100 may be configured to classify the type of foreign objects by the previously trained artificial intelligence model transmitted from the server 300.

The controller 128 of the foreign object detecting apparatus 100 may include all kinds of devices which can process the data, like a processor, for example, an MCU. Here, a processor may refer to a data processing device embedded in hardware which has a physically configured circuit to perform a function expressed by a code or a command included in a program. Examples of the data processing device built in hardware include, but are not limited to, processing devices such as a microprocessor, a central processing unit (CPU), a processor core, a multiprocessor, an application-specific integrated circuit (ASIC), a field programmable gate array (FPGA), and the like.

The communicator 129 of the foreign object detecting apparatus 100 may provide a communication interface which interworks with the network 400 to provide a transmission/reception signal between the user terminal 500 and/or the server 300 in the form of packet data. Further, the communicator 129 may support various kinds of object intelligence communications (such as Internet of things (IoT), Internet of everything (IoE), and Internet of small things (IoST)) and may support communications such as machine to machine (M2M) communication, vehicle to everything communication (V2X), and device to device (D2D) communication.

In some embodiments of the present disclosure, processing units of the foreign object detecting apparatus 100 may include one or more processors. In some embodiments of the present disclosure, units 122, 124, 136, 128, and 129 of the foreign object detecting apparatus 100 may correspond to one or more processors. In some embodiments of the present disclosure, the units 122, 124, 136, 128, and 129 may correspond to software components configured to be executed by the one or more processors.

FIG. 5 is a view schematically illustrating a foreign object detecting process of a foreign object detecting apparatus according to an embodiment of the present disclosure.

The microphone 110 may detect a noise generated when the washing/drying is performed in the laundry machine 200. Sound information having a specific pattern generated when a metal (buckle, coin, etc.) or a foreign object formed of a very hard plastic material in the laundry in the tub of the laundry machine 200 is bumped against the tub during the course may be collected by the microphone 110 of the laundry machine. The detected sound information may be transmitted to the foreign object detecting apparatus 100 integrated in the user terminal 500 or the laundry machine 200.

The artificial intelligence model learner 124 may train the foreign object classifying engine based on the noise data collected by the data collector 122 and data obtained by matching the label of the type of foreign object to the noise data. The noise data generated when the foreign object collides with the tub in accordance with a type of a hard plastic and metal and various materials is transmitted to the laundry machine 200 or the user terminal and then learned for every specific pattern according to the class by a machine learning classifying algorithm (K-NN) through an operation process.

The foreign object classifier 126 monitors whether the noise data collected by the microphone 110 exceeds a predetermined threshold and if the collected noise data exceeds the predetermined threshold, may estimate a type of foreign object by the previously trained artificial intelligence model. The foreign object classifier 126 determines whether there is a foreign object with the noise data transmitted from the microphone 110 as an input through the foreign object classifying engine which is trained by the artificial intelligence model learner 124 of the server 300 or the foreign object detecting apparatus 100 and may classify the type of foreign objects. The type of foreign objects is classified into metal (class 1), plastic (class 2), and coin or other noises (class 3) by defining a normal range or an abnormal range. Further, a higher noise which is out of the normal range and the abnormal range for classifying the type of foreign objects may be classified as a noise due to unbalance (UB) of the laundry which is different from the noise due to the foreign objects. The unbalance (UB) of the laundry may be generated when the collected noise data exceeds a predetermined threshold for determining a foreign object classification range to be equal or higher than a predetermined decibel. Dewatering noise data generated when the tub rotates to dewater the laundry is collected through the microphone mounted in the laundry machine. The previously trained artificial intelligence model is trained with learning data including dewatering noise data and data obtained by matching a label of a type of foreign object or unbalance of the laundry to the dewatering noise data to classify and output the type of foreign objects or the unbalance (UB) of the laundry.

In the embodiment of the present disclosure, when a type of foreign object is output with respect to the noise data input, it is determined that there is a foreign object. Further, when the type of foreign object is not output with respect to the noise data input, it is determined that there is no foreign object. When there is no foreign object, the noise level is lower than that of a noise in a foreign object classification range or higher than that of the foreign object classification range. Further, when the type of foreign object is not output, if the noise level is high, it is determined that the level of the noise exceeds a range for classifying the type of foreign object and the noise is caused by the unbalance of the laundry which is different from the noise due to the foreign object. Therefore, only if the noise level is small, it is determined that there is no foreign object.

When the foreign object classifier 126 classifies and outputs the type of foreign objects, for example, when the noise level is equal to or higher than a predetermined threshold, the controller 128 stops the course and generates an alarm or displays the noise on a display of a mobile phone of the user and notifies the user to protect the tub and laundries. When the foreign object classifier 126 classifies and outputs the type of foreign objects, the controller 128 may stop the washing/drying course of the laundry machine 200. When the type of foreign object is output or a level of the noise exceeds the range for classifying the type of foreign object to be determined that there is unbalance of the laundry, the communicator 129 may notify the user through the user terminal 500 or directly.

FIG. 6 is a flowchart of a method of detecting foreign objects in a laundry machine according to an embodiment of the present disclosure.

The method of detecting foreign objects in a laundry machine may start when a power is supplied to the laundry machine 200 or a laundry is put into the tub, and separately, the foreign object detecting apparatus 100 is turned on by the user's setting in step S1000.

The foreign object detecting apparatus 100 may collect noise data from the microphone 110 at the time of measuring a laundry amount or during the tub rotating course, after putting the laundry in the tub in step S1100. In addition to the time of the measurement of the laundry amount, the foreign object detecting apparatus 100 may collect dewatering noise data generated when the tub rotates to dewater the laundry. The dewatering noise data collection may be used to determine whether the laundry is unbalanced.

Further, the noise data may be transmitted to the user terminal 500 through a communicator mounted in the laundry machine 200 in step S1200.

The foreign object detecting apparatus 100 of the laundry machine 200 or the user terminal 500 analyzes the transmitted noise data and when the noise level is lower than a predetermined threshold in step S1300, continuously collects the noise data through the microphone in step S1100.

The foreign object detecting apparatus 100 of the laundry machine 200 or the user terminal 500 analyzes the transmitted noise data and when the noise level is equal to or higher than the predetermined threshold in step S1300, may classify the foreign objects through the artificial intelligence model which is trained in advance in step S1400. In another embodiment of the present disclosure, when the level of the noise has decibel which is out of the foreign object classification range, it is determined that the noise is caused by the unbalance of the laundry, rather than the foreign object.

After classifying the foreign objects, the foreign object detecting apparatus 100 of the laundry machine 200 or the user terminal 500 may stop the course of the laundry machine 200 through the controller 128 in step S1500. In another embodiment of the present disclosure, when it is determined that the noise is caused by the unbalance of the laundry, rather than the foreign object, the course of the laundry machine 200 may be stopped.

After classifying the type of foreign objects, the foreign object detecting apparatus 100 of the laundry machine 200 or the user terminal 500 may notify the user of the classified result in step S1600. For example, after classifying the foreign objects, the foreign object detecting apparatus 100 of the laundry machine 200 or the user terminal 500 notifies of the presence of the foreign object and the type of foreign object on a display of the user terminal 500 via the communicator 129 with a text or a picture through an application app.

After notifying the user of the foreign object classifying result by the foreign object detecting apparatus 100, the foreign object detecting process ends in step S1700.

In another embodiment of the present disclosure, a program which is programmed to execute the foreign object type classifying method may be stored in a computer-readable recording medium.

FIG. 7 is a flowchart of training a foreign object classifying engine by an artificial intelligence model learner according to an embodiment of the present disclosure.

Referring to FIG. 6, a process of training a previously trained artificial intelligence model which is included in step S1400 and classifies the type of foreign objects is illustrated. The learning of the artificial intelligence model to identify the type of foreign object, which will be applied to the foreign object detecting apparatus 100, starts in step S100.

Artificial intelligence model learning data including a plurality of noise data and data obtained by matching a label of the type of foreign objects to the plurality of noise data may be generated in step S110. The artificial intelligence model, such as a machine learning technique and an artificial neural network including CNN or RNN may learn features of the type of foreign objects using the learning data collected through supervised learning in step S120. The artificial intelligence model learner 124 may perform an artificial intelligence-based convolution neural network (CNN), a recurrent neural network (RNN), and a long short-term memory (LSTM) based on an obtained motor current pattern to estimate the type of foreign objects.

The noise data may include a level of the noise and an interval of the noise and may be features extracted by techniques widely used in a sound recognition field. For example, MFCC (mel frequency cepstral coefficient) which is the most typical method for extracting a sound may be used to extract features. The MFCC is a technique of directly extracting a feature of the sound by dividing the input sound into predetermined sections (short time) and analyzing a spectrum for the section, rather than the entire input sound.

In the embodiment of the present disclosure, in order to train the artificial intelligence model, pytorch or tensorflow which is a deep learning implementation library used for the artificial intelligence program may be used.

The artificial intelligence model is generated through evaluation of the previously trained artificial intelligence model (S130) in step S140. The previously trained artificial intelligence model may be evaluated (S130) using testing data. Throughout the present specification, the "previously trained artificial intelligence model" may refer to determining of the model trained after training the learning data and testing using the testing data, without being specifically mentioned. The machine learning algorithm and artificial intelligence techniques which are applicable to the artificial intelligence model for learning the foreign object type classifying method will be described with reference to FIGS. 8A, 8B, and 9.

FIG. 8A is an exemplary diagram of a K-nearest neighbor (K-NN) algorithm according to an embodiment of the present disclosure.

As an artificial intelligence learning method for classifying the type of foreign objects, classification of machine learning, a decision-tree algorithm, and a K-NN algorithm may be used. The K-NN algorithm is a machine learning technique which compares data (metal, plastic, coins, etc.) for every class previously learned by the classifying algorithm through the supervised learning and newly input noise data to classify data which is closest to the class. The K-NN algorithm which is a nonparametric model is subjected to a process of predicting an interest observation using properties of the observations after determining K observations which are close to an observation to be expected. During this process, a conception of probability distribution is not used so that the K-NN algorithm is a nonparametric model.

For example, as illustrated in FIG. 8A, when there are metal (denoted by triangles) and plastic (denoted by squares), if a newly input noise (denoted by circles) is given, the K-NN algorithm may set a range represented by a solid line and a dotted line as a K value and assign a weight depending on a short distance or a long distance. In FIG. 8A, a vertical axis is a time interval (s) and a horizontal axis is a level (dB) of noise. That is, it is understood that the metal is mostly distributed to the right side from the center on the horizontal axis so that the noise level of the metal is higher than that of the plastic and the plastic is mostly located to the left side from the center of the horizontal axis so that the noise level of the plastic is relatively lower than that of the metal. In FIG. 8A, points close to a solid line area (K=1) are metal and the number of metals is two and the number of plastics is one so that the new noise may be classified as metal. When the range is expanded to the dotted line by increasing the K value to K=2, the number of plastics is three and the number of metals is two so that the number of plastics is larger. Therefore, the newly input noise is classified as plastic.

The foreign object classifier 126 may classify the type of foreign objects using other machine learning or artificial neural network algorithms such as Naive Bayes, decision trees, classification rule learners, linear regression, regression trees, model trees, neural networks, or support vector machines as well as the K-nearest neighbor algorithm.

FIG. 8B is an exemplary diagram of classifying a type of materials of foreign objects according to a noise level of a foreign object.

FIG. 8B is a table representing a type of materials of foreign objects in accordance with a noise level of foreign objects. When a class of the input noise level is equal to or higher than a level 2, the previously trained data (plastic and metal) is compared with class 1 and class 2 to be classified as the most similar group. In the case of a nose which does not exist in the existing data, when the noise is equal to or higher than level 2, even though the nose is not in the existing data, the noise may be classified as a noise in an abnormal range.

In Table 1, the foreign objects are classified in accordance with a noise level on a horizontal axis of a graph to which the K-nearest neighbor algorithm of FIG. 8A is applied in accordance with the reference of FIG. 8B. Table 1 includes a classification of a time interval in addition to the classification by the noise level of FIG. 8B.

TABLE 1

|  | Class | Type of foreign object material (noise) | Noise level (Unit: dB) | Time interval (s) |
| --- | --- | --- | --- | --- |
| ○ | Class 0 | Newly input noise | 28 to 32 | 0.8 to 1.1 |
| □ | Class 1 | Noise by Plastic | 0 to 9 (normal range) | |
|  |  |  | 10 to 29 (abnormal range) | 0.6 to 1.8 (abnormal range) |
| Δ | Class 2 | Noise by metal | 0 to 24 (normal range) | |
|  |  |  | 24 to 50 (abnormal range) | 0.9 to 2 (abnormal range) |
| Other noise | Class 3 | Coin or Other noise | 0 to 50 (normal range) | |
|  |  |  | 45 to 70 (abnormal range) | 0.5 to 2 (abnormal range) |

In the embodiment of the present disclosure, as illustrated in Graph of FIG. 8A, when the K-nearest neighbor algorithm is applied in accordance the noise level and the time interval, a noise level of the newly input noise (denoted by a circle) is 28 to 32 dB and a time interval is 0.8 to 1.1 S so that when K=1, the newly input noise may be classified as metal. In the meantime, when K=2, the newly input noise may be classified as plastic.

In another embodiment of the present disclosure, when the type of foreign objects is classified only by the noise level as illustrated in FIG. 8B, the newly input noise is the closest to 32 dB which is metal, so that the newly input noise may be classified as metal.

FIG. 9 is an exemplary diagram of an artificial neural network according to an embodiment of the present disclosure.

The artificial intelligence (AI) is one field of computer science and information technology that studies methods to make computers mimic intelligent human behaviors such as reasoning, learning, self-improving and the like.

In addition, the artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed.

More specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may take an approach that builds models for deriving predictions and decisions from inputted data.

Many Machine Learning algorithms have been developed on how to classify data in the Machine Learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. In addition, the Artificial Neural Network can include the synapse for connecting between neuron and neuron.

An ANN may be defined by the following three factors: (1) a connection pattern between neurons on different layers; (2) a learning process that updates synaptic weights; and (3) an activation function generating an output value from a weighted sum of inputs received from a lower layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

In general, a single-layer neural network may include an input layer and an output layer.

Further, in general, a multi-layer neural network may include an input layer, one or more hidden layers, and an output layer.

The Input layer is a layer that accepts external data, the number of neurons in the Input layer is equal to the number of input variables, and the Hidden layer is disposed between the Input layer and the Output layer and receives a signal from the Input layer to extract the characteristics to transfer it to the Output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

In the meantime, a deep neural network with a plurality of hidden layers between the input layer and the output layer may be the most representative type of artificial neural network which enables deep learning, which is one machine learning technique.

The Artificial Neural Network can be trained by using training data. Herein, the training can mean a process of determining a parameter of the Artificial Neural Network by using training data in order to achieve the objects such as classification, regression, clustering, etc. of input data. As a representative example of the parameter of the Artificial Neural Network, there can be a weight given to a synapse or a bias applied to a neuron.

An artificial neural network trained using training data can classify or cluster inputted data according to a pattern within the inputted data.

Throughout the present specification, an artificial neural network trained using training data may be referred to as a trained model.

Hereinbelow, learning paradigms of an artificial neural network will be described in detail.

The learning method of the Artificial Neural Network can be largely classified into Supervised Learning, Unsupervised Learning, Semi-supervised Learning, and Reinforcement Learning.

The Supervised Learning is a method of the Machine Learning for inferring one function from the training data.

Then, among the thus inferred functions, outputting consecutive values is referred to as regression, and predicting and outputting a class of an input vector is referred to as classification.

In the Supervised Learning, the Artificial Neural Network is learned in a state where a label for the training data has been given.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, the parameter of the Artificial Neural Network can be determined (optimized) by evaluating the function inferred from the Artificial Neural Network.

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include clustering and independent component analysis.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One of semi-supervised learning techniques involves guessing the label of unlabeled training data, and then using this guessed label for learning. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

Reinforcement learning may be performed mainly through a Markov decision process (MDP).

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. Adam may include a method that combines momentum and RMSProp and increases optimization accuracy in SGD by adjusting the step size and step direction.

Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

The learning of the type of foreign object or the artificial intelligence model which identifies the type of foreign object may be performed by any one of supervised learning, unsupervised learning, and reinforcement learning.

The convolution neural network is the most representative method of a deep neural network and specializes an image from a small feature to a complex feature. The CNN is an artificial neural network having a structure which is configured by one or a plurality of convolution layers and general artificial neural network layers disposed thereon to perform the preprocessing on the convolution layer. For example, in order to learn an image of a human face through the CNN, first, simple features are extracted using a filter to create one convolution layer and a new layer, for example, a pooling layer which extracts a more complex feature from the features is added. The convolution layer is a layer which extracts features through a convolution operation and performs a multiplication with a regular pattern. The pooling layer is a layer which abstracts an input space and reduces a dimension of an image through sub-sampling. For example, a face image with a size of 28×28 is changed into feature maps of 24×24 using four filters with a stride of 1 and compressed into 12×12 by sub-sampling (or pooling). In a next layer, 12 picture maps with a size of 8×8 are created and then sub-sampled to be 4×4 to finally learn with a neural network having 192 (=12×4×4) inputs to classify the image. A plurality of convolution layers is connected to extract a feature of the image and finally learning is performed using an error backpropagation neural network of the related art. The advantage of the CNN is to create a filter which characterizes a feature of the image through the artificial neural network learning by itself.

A recurrent neural network (RNN) refers to a neural network having a recursive connection structure in which an output of a neuron is fed back to an input. A multilayer perceptron neural network has a drawback in that the input is activated only in an output direction and a hidden neuron does not remember the past information. This drawback is very vulnerable to problems related to a time-series analysis. The RNN solves the above-mentioned drawback. In the existing deep neural networks (DNN), parameters are independent on every layer, but the RNN shares the parameters. Therefore, the current output result is influenced by a result of a previous time step and the hidden layer serves as a kind of memory.

A basic principle of the RNN is $h_t=g1(x_tU+Wh_{t-1}+bx)$, $o_t=g2(Vh_t+bh)$.

g1 g2: Non-linear activation function (Sigmoid, tan h, etc.)

$x_t$: Input value $h_t$: Hidden variable in t (time) step (hidden state)

$o_t$: Output value in t (time) step b: Bias

U, V, W: Weights of $x_t$, $h_t$, and $h_{t-1}$, respectively

In the above equation, when an input X=(x1, x2, x3, ..., xn) is input, $o_t$ is output.

However, a typical RNN model and a Bi-directional RNN have a vanishing gradient problem. There is a drawback in that when the learning is continued for a long time, initial learning contents are lost, so that the long short-term memory (LSTM) is an architecture which improves the drawback. Values are adjusted by putting cells called "Gate" to input, forget, and output parts of the RNN. Forget gate determines whether to store previous state information, input gate determines whether to store new input information, and output gate controls an output value of an updated cell.

In the embodiment of the present disclosure, the CNN artificial neural network model extracts a vector or a spectrum of a feature of the noise for distinguishing the noises using MFCC and configures a two-dimensional sound map of the vectors or spectrums to have a deep neural network structure having two input layers of a noise level and a noise interval, five hidden layers, and three output layers for foreign objects such as plastic, metal, and coin and other noises.

In another embodiment of the present disclosure, in order to classify the type of noise, the RNN or LSTM artificial neural network model may be used. The RNN or LSTM artificial neural network model may have the RNN deep neural network structure which distinguishes the input noise to be plastic, metal, or coins and other noises using a time-series characteristic of the noise. Further, a CNN+LSTM artificial intelligence model may be used.

In the embodiment of the present disclosure, an artificial intelligence language library such as TensorFlow or Pytorch which is used for artificial intelligence programming may be used to train a deep learning-based artificial intelligence model.

Embodiments according to the present disclosure described above may be implemented in the form of computer programs that may be executed through various components on a computer, and such computer programs may be recorded in a computer-readable medium. In this case, examples of the computer-readable media may include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the example embodiments described above or by the use of such terms unless limited by the appended claims. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof.

Therefore, technical ideas of the present disclosure are not limited to the above-mentioned embodiments, and it is intended that not only the appended claims, but also all changes equivalent to claims, should be considered to fall within the scope of the present disclosure.

What is claimed is:

1. A method of detecting a foreign object in a tub of a laundry machine, the method comprising:
    collecting, by a microphone mounted in the laundry machine, noise data generated when the tub is rotated after putting laundry in the tub;
    monitoring whether the collected noise data exceeds a predetermined threshold; and
    estimating a type of the foreign object present in the tub through a previously trained artificial intelligence model when the collected noise data exceeds the predetermined threshold,
    wherein the previously trained artificial intelligence model is a foreign object classifying engine which is trained with learning data including previous noise data and data obtained by matching a label of the type of the foreign object to the previous noise data to classify and output the type of the foreign object.

2. The method of claim 1, wherein the estimating of the type of the foreign object includes:
    applying the collected noise data to the previously trained artificial intelligence model to classify the type of the foreign object; and
    outputting information about the type of the foreign object from the previously trained artificial intelligence model.

3. The method of claim 1, wherein the previously trained artificial intelligence model is configured to classify the type of the foreign object through a K-nearest neighbor algorithm using the collected noise data.

4. The method of claim 1, further comprising:
collecting, by the microphone, dewatering noise data generated when the tub is rotated to dewater the laundry,
wherein the previously trained artificial intelligence model is configured to be trained with learning data including previous collected noise data, previously collected dewatering noise data, data obtained by matching a label of the type of the foreign object to the collected noise data, and data obtained by matching a label of the unbalance of the laundry to the collected dewatering noise data to classify and output the type of the foreign object or the unbalance of the laundry, and
wherein the unbalance of the laundry is generated when the collected dewatering noise data exceeds a predetermined threshold for determining a foreign object classification range to be equal to or higher than a predetermined decibel.

5. The method of claim 1, wherein the collected noise data includes a noise level and a noise interval.

6. The method of claim 5, further comprising stopping a laundry machine course of the laundry machine when the noise level and the noise interval are equal to or higher than the predetermined threshold.

7. The method of claim 5, further comprising notifying a user when the noise level and the noise interval are equal to or higher than the predetermined threshold.

8. The method of claim 1, further comprising, after the collecting of noise data, transmitting the collected noise data to a user terminal,
wherein the monitoring and the estimating of the type of the foreign object are executed in the user terminal.

9. A non-transitory computer-readable recording medium which stores a program programmed to perform the method of claim 1.

10. An apparatus to detect a foreign object in a tub of a laundry machine, the apparatus comprising:
a microphone mounted in the laundry machine to collect noise generated when the tub of the laundry machine is rotated after putting laundry in the tub; and
a foreign object classifier configured to:
monitor whether the noise data collected by the microphone exceeds a predetermined threshold; and
classify a type of the foreign object present in the tub through a previously trained artificial intelligence model when the collected noise data exceeds the predetermined threshold,
wherein the previously trained artificial intelligence model is a foreign object classifying engine which is trained with learning data including previous noise data and data obtained by matching a label of the type of the foreign object to the previous noise data to classify and output the type of foreign object.

11. The apparatus of claim 10, wherein the foreign object classifier is configured to:
apply the collected noise data to the previously trained artificial intelligence model to classify the type of the foreign object; and
output information about the type of the foreign object from the previously trained artificial intelligence model.

12. The apparatus of claim 10, wherein the artificial intelligence model is configured to classify the type of the foreign object through a K-nearest neighbor algorithm using the collected noise data.

13. The apparatus of claim 10 wherein the microphone is configured to collect dewatering noise data generated when the tub rotates to dewater the laundry,
wherein the previously trained artificial intelligence model is configured to be trained with learning data including previous collected noise data, previously collected dewatering noise data, data obtained by matching a label of the type of the foreign object to the collected noise data, and data obtained by matching a label of the unbalance of the laundry to the collected dewatering noise data to classify and output the type of the foreign object or the unbalance of the laundry, and
wherein the unbalance of the laundry is generated when the collected dewatering noise data exceeds a predetermined threshold for determining a foreign object classification range to be equal to or higher than a predetermined decibel.

14. The apparatus of claim 10, wherein the collected noise data includes a noise level and a noise interval.

15. The apparatus of claim 14, further comprising a controller configured to stop a laundry machine course of the laundry machine when the noise level and the noise interval are equal to or higher than the predetermined threshold.

16. The apparatus of claim 14, further comprising a communicator configured to notify a user when the noise level and the noise interval are equal to or higher than the predetermined threshold.

17. A mobile terminal for executing an application which detects a foreign object in a tub of a laundry machine, wherein the mobile terminal is configured to:
receive noise data collected from a microphone mounted in the laundry machine which detects a noise generated when the tub rotates after putting laundry in the tub;
monitor whether the collected noise data exceeds a predetermined threshold; and
estimate a type of the foreign object through a previously trained artificial intelligence model when the collected noise data exceeds the predetermined threshold,
wherein the previously trained artificial intelligence model is a foreign object classifying engine which is trained with learning data including previous noise data and data obtained by matching a label of the type of the foreign object to the previous noise data to classify and output the type of foreign object.

18. A system of detecting a foreign object in a tub of a laundry machine, the system including:
the laundry machine;
an apparatus to detect the foreign object, the apparatus including:
a microphone mounted in the laundry machine to collect noise generated when the tub of the laundry machine is rotated after putting laundry in the tub; and
a foreign object classifier configured to:
monitor whether the noise data collected by the microphone exceeds a predetermined threshold; and
classify a type of the foreign object through a previously trained artificial intelligence model of a foreign object classifying engine when the collected noise data exceeds the predetermined threshold; and
a server, the server including an artificial intelligence model learner configured to generate the foreign object classifying engine trained with the collected noise data through an artificial neural network, the server being configured to transmit the trained foreign object classifying engine to the apparatus, wherein the foreign object classifier is configured to classify the type of the foreign object through the trained foreign object classifying engine transmitted from the server.

* * * * *